(No Model.)

G. H. IVES.
DRILL CHUCK.

No. 421,718. Patented Feb. 18, 1890.

Witnesses:
Chas. B. Shumway
Harry A. Hall

Inventor
George H. Ives
By George O. Seymour
Attys.

UNITED STATES PATENT OFFICE.

GEORGE H. IVES, OF MYSTIC RIVER, CONNECTICUT.

DRILL-CHUCK.

SPECIFICATION forming part of Letters Patent No. 421,718, dated February 18, 1890.

Application filed June 27, 1889. Serial No. 315,694. (No model.)

*To all whom it may concern:*

Be it known that I, GEORGE H. IVES, residing at Mystic River, in the county of New London and State of Connecticut, have invented certain new and useful Improvements in Drill-Chucks; and I do declare the following to be a full, clear, and exact description of the same, reference being had to the accompanying drawings, which form a part of this specification.

My invention relates to an improvement in drill-chucks, the object being to produce a simple, strong, durable, and efficient tool.

With these ends in view my invention consists in certain details of construction and combinations of parts, as will be hereinafter described, and pointed out in the claim.

Figure 1:
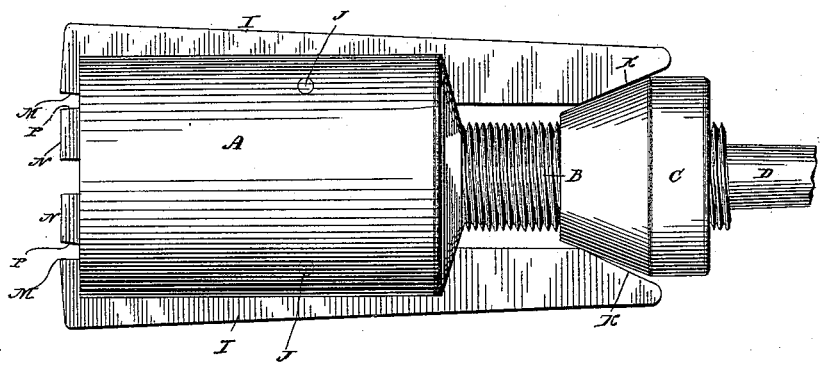
Figure 2:
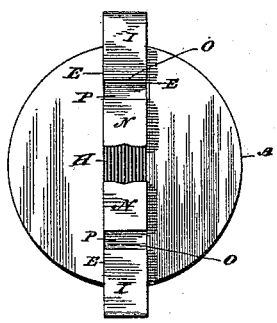
Figure 3:
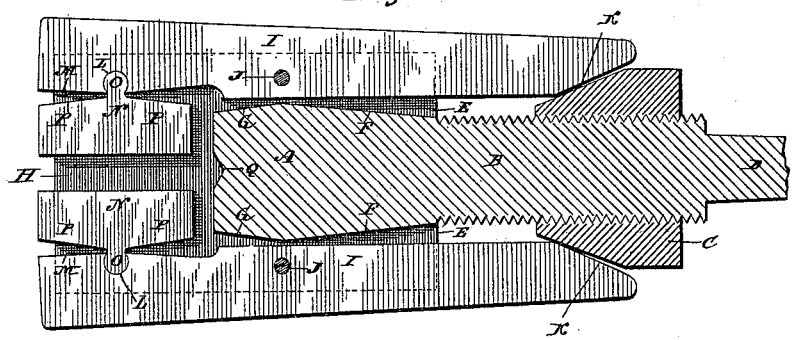

In the accompanying drawings, Figure 1 is a view in side elevation of a chuck embodying my invention. Fig. 2 is a view thereof in front elevation; and Fig. 3 is a view of the tool in vertical longitudinal section, with the jaws and levers in elevation.

As herein shown, the tool has a cylindrical head A, provided at its rear end with a threaded shank B, carrying the operating-cone C, and with a smooth spindle D, by means of which the tool is secured in the lathe. The said head A is provided at opposite points upon its periphery with two long slots E E, extending throughout its length, and each having an inclined floor F, inclining rearward and merging into the threaded shank, and a shorter inclined floor G of opposite inclination. The forward end of the head is provided with a transverse slot H, formed in line with the forward ends of the slots E E, which combine with it to form a transverse slot extending clear across the said end of the head. Two long levers I I, respectively located in the slots E E, are fulcrumed therein at points just forward of their longitudinal centers upon transverse pivots J J, entering the opposite walls of the slots and located adjacent to the meeting points of the inclined bottom walls thereof. The rear ends of the said levers project beyond the rear ends of the slots, and are each provided with a bevel K, for engagement with the cone C before mentioned. The forward ends of the levers project slightly beyond the forward end of the head and have their inner faces transversely cut away to form sockets L, from which the said faces are beveled, as at M M, in opposite directions. The said levers are adapted in transverse section to project radially out of the slots. Two jaws N N, having straight inner faces, are provided upon their outer faces with transverse rounded knuckles O O, shaped in cross-section to fit closely into the said sockets, the said outer faces of the jaws being beveled, as at P P, in opposite directions. The forward end of the head is provided at the inner end of the slot H with a centering depression or recess Q, which receives the inner ends of the drills and centers them.

In using my improved chuck the cone is turned back upon its threaded shaft, whereby the jaws are permitted to separate for the introduction of the drill, the inner end whereof is entered into the recess in the forward end of the head. The cone is now turned forward to cause the levers to clamp the jaws upon the drill, which they will hold so firmly that practically it cannot be turned, and this because of the great length of the levers, whereby a great leverage is obtained, and because their construction and that of the jaws permits great strain to be imposed upon them without danger of breaking any part of the tool, whereas in prior constructions the levers have been weakened by being cut away for attachment to the head and for the attachment to them of the jaws, which have also been weakened in the same manner. The levers and jaws are also prevented from any lateral play or deflection by the walls of the slots in which they are located.

Having fully described my invention, what I claim as new, and desire to secure by Letters Patent, is—

In a drill-chuck, the combination, with a cylindrical head provided with two slots extending throughout its length and located at opposite points in its periphery, and also provided at its rear end with a threaded shank and with a spindle, and at its forward end with a transverse slot and a centering-recess, of two long levers respectively fulcrumed in the said slots and extending beyond the rear ends thereof and beveled, a cone mounted upon the said threaded shank for engagement with the beveled ends of the levers, and two jaws located within the said transverse slot and respectively provided upon their outer faces with transverse rounded knuckles, which fit into transverse sockets of corresponding cross-section formed in the inner edges of the forward ends of the two levers, the adjacent faces of the jaws and levers being cut away for clearance, substantially as set forth.

In testimony whereof I have signed this specification in the presence of two subscribing witnesses.

GEO. H. IVES.

Witnesses:
 A. H. SIMMONS,
 J. O. FISH.